US012674436B2

(12) United States Patent
Lipka

(10) Patent No.: US 12,674,436 B2
(45) Date of Patent: Jul. 7, 2026

(54) VORTEX GENERATOR FOR A WIND TURBINE ROTOR BLADE

(71) Applicant: Nordex Energy SE & Co. KG, Hamburg (DE)

(72) Inventor: Thomas Lipka, Rostock (DE)

(73) Assignee: Nordex Energy SE & Co. KG, Hamburg (DE)

( * ) Notice: Subject to any disclaimer, the term of this patent is extended or adjusted under 35 U.S.C. 154(b) by 0 days.

(21) Appl. No.: 19/057,736

(22) Filed: Feb. 19, 2025

(65) Prior Publication Data

US 2025/0270977 A1     Aug. 28, 2025

(30) Foreign Application Priority Data

Feb. 28, 2024     (EP) ..................................... 24160188

(51) Int. Cl.
*F03D 1/06*          (2006.01)

(52) U.S. Cl.
CPC .. *F03D 1/06495* (2023.08); *F05B 2240/3062* (2020.08)

(58) Field of Classification Search
CPC ..................... F03D 1/06495; F05B 2240/3062
See application file for complete search history.

(56) References Cited

U.S. PATENT DOCUMENTS

| | | | | |
|---|---|---|---|---|
| 2009/0087314 A1* | 4/2009 | Haag | ..................... | F03D 7/0224 |
| | | | | 416/223 R |
| 2012/0201690 A1 | 8/2012 | Fuglsang et al. | | |
| 2012/0257977 A1* | 10/2012 | Jensen | .................. | F03D 1/0608 |
| | | | | 416/223 R |
| 2012/0257978 A1* | 10/2012 | Jensen | .................. | F03D 1/0608 |
| | | | | 416/223 R |

(Continued)

FOREIGN PATENT DOCUMENTS

| | | |
|---|---|---|
| CN | 205841096 U | 12/2016 |
| CN | 207420779 U | 5/2018 |

(Continued)

OTHER PUBLICATIONS

Extended European search report of the European Patent Office dated Aug. 30, 2024 in European application No. 24160188.9 from which priority is claimed.

*Primary Examiner* — Aaron R Eastman
(74) *Attorney, Agent, or Firm* — Walter Ottesen, P.A.

(57)          ABSTRACT

A vortex generator for a wind turbine rotor blade includes a base plate having a lower surface configured for being mounted to an outer surface of the wind turbine rotor blade, an upper surface opposite the lower surface, a front edge, a rear edge and a longitudinal axis, wherein the rear edge of the base plate includes a perpendicular section arranged perpendicular to the longitudinal axis, and at least one plate-shaped fin with a first longitudinal section arranged at the upper surface of the base plate, a second longitudinal section which extends beyond the rear edge and has a lower (Continued)

edge which is not connected to the base plate. The first longitudinal section includes a rear part arranged rearwards of the perpendicular section and the base plate includes a first stiffening section arranged rearwards of the perpendicular section and forming a transition to the rear part.

15 Claims, 3 Drawing Sheets

(56)                References Cited

U.S. PATENT DOCUMENTS

| | | | | |
|---|---|---|---|---|
| 2012/0257979 | A1* | 10/2012 | Jensen | F03D 1/0675 |
| | | | | 416/223 R |
| 2012/0269640 | A1 | 10/2012 | Enevoldsen et al. | |
| 2014/0140856 | A1* | 5/2014 | Madsen | F03D 7/022 |
| | | | | 29/889.1 |
| 2015/0316025 | A1 | 11/2015 | Enevoldsen et al. | |
| 2015/0322791 | A1* | 11/2015 | Flach | F03D 1/0675 |
| | | | | 156/60 |
| 2016/0017864 | A1* | 1/2016 | Grabau | F03D 1/0633 |
| | | | | 416/235 |
| 2016/0215758 | A1* | 7/2016 | Corten | B64C 23/06 |
| 2017/0138341 | A1* | 5/2017 | Fukami | F03D 9/25 |
| 2017/0248116 | A1* | 8/2017 | Fukami | F03D 13/10 |
| 2017/0248117 | A1* | 8/2017 | Fukami | F03D 1/0675 |
| 2019/0211800 | A1* | 7/2019 | Madsen | F03D 1/0675 |
| 2019/0285046 | A1* | 9/2019 | Doosttalab | F03D 1/0633 |
| 2019/0309726 | A1* | 10/2019 | Rasmussen | F03D 1/0633 |
| 2019/0316565 | A1* | 10/2019 | Wang | F03D 1/0633 |
| 2019/0345912 | A1* | 11/2019 | Picard | F03D 1/0675 |
| 2020/0149507 | A1* | 5/2020 | Arce | F03D 1/0675 |
| 2021/0222671 | A1* | 7/2021 | Messing | F03D 1/0658 |
| 2022/0186705 | A1* | 6/2022 | Kamruzzaman | F03D 1/0608 |
| 2023/0125246 | A1* | 4/2023 | Rautmann | F03D 1/0675 |
| | | | | 416/223 R |
| 2023/0279835 | A1* | 9/2023 | Petitjean | F03D 1/0633 |
| 2023/0407837 | A1* | 12/2023 | Harada | F03D 1/06495 |
| 2024/0200530 | A1* | 6/2024 | Bekiropoulos | F03D 1/0641 |
| 2025/0043765 | A1* | 2/2025 | Wood | F03D 1/06495 |

FOREIGN PATENT DOCUMENTS

| | | | |
|---|---|---|---|
| CN | 113757038 | A | 12/2021 |
| DE | 10 2013 201 871 | A1 | 8/2014 |
| DE | 10 2016 217 139 | A1 | 3/2018 |
| EP | 2 400 148 | A2 | 12/2011 |
| EP | 2 824 320 | A1 | 1/2015 |
| EP | 2 940 292 | B1 | 3/2018 |
| EP | 3 042 073 | B1 | 7/2019 |
| EP | 3 540 211 | A1 | 9/2019 |
| EP | 3 690 230 | A1 | 8/2020 |

* cited by examiner 14b
24
14a
26
22
18
12
16
14
20

14b
24
14a
14
16
48
12
18

36
34
18
34
R
14b
32
28
46
30
38
12
10
14
14a
16
20

Fig. 4
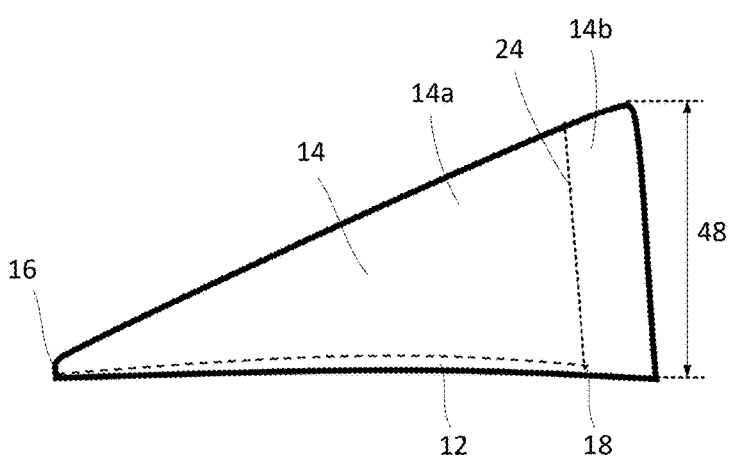
Fig. 5
Fig. 6
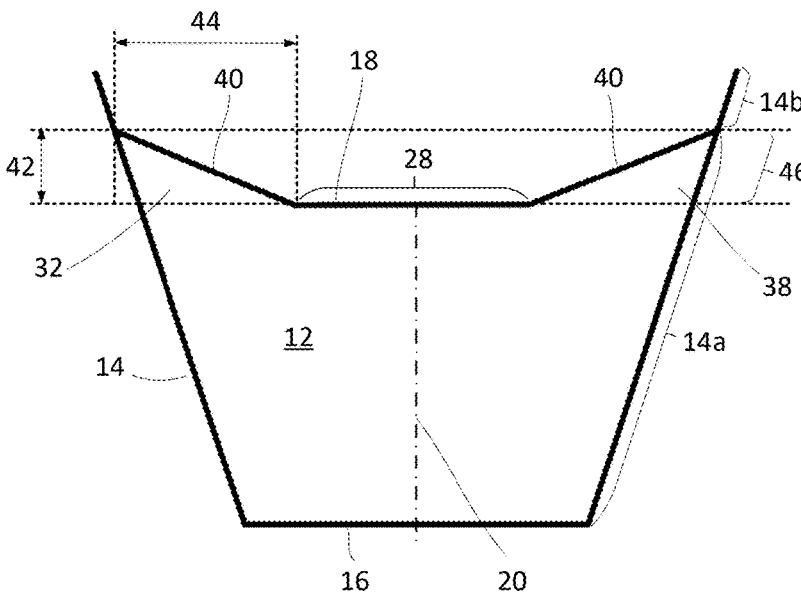

VORTEX GENERATOR FOR A WIND TURBINE ROTOR BLADE

CROSS-REFERENCE TO RELATED APPLICATIONS

This application claims priority of European patent application no. 24 160 188.9, filed Feb. 28, 2024, the entire content of which is incorporated herein by reference.

TECHNICAL FIELD

The disclosure relates to a vortex generator for a wind turbine rotor blade. Mounted to an outer surface of a wind turbine rotor blade, vortex generators cause small vortices in the boundary layer of a surrounding airflow. This can prevent or delay a separation of flow under certain operating conditions.

BACKGROUND

EP 2 400 148 B1 discloses vortex generators having a three-dimensional shape with various curved or inclined surfaces. The shape is referred to as sand dune shape.

EP 2 824 320 B1 discloses vortex generators having a complex, three-dimensional shape referred to as a fluid foil.

DE 10 2013 201 871 C5 discloses vortex generators having a base plate and a fin formed in one piece using a fiber-reinforced plastics material. A transition region between the fin and the base plate is thickened so that the fin can better withstand aerodynamic forces.

EP 3 042 073 B1 discloses vortex generators having U-shaped or W-shaped base plates and two fins connected thereto along their full length.

US 2019/0285046 as well as EP 3 690 230 B1 disclose vortex generators.

SUMMARY

It is an object of the disclosure to provide a vortex generator that is more robust and has an extended service life.

The aforementioned object is, for example, solved by various vortex generators for a wind turbine rotor blade according to the disclosure.

According to an embodiment, a vortex generator is for a wind turbine rotor blade and includes:

a base plate arranged in a base plate plane and having:
a lower surface configured for being mounted to an outer surface of the wind turbine rotor blade,
an upper surface opposite the lower surface,
a front edge,
a rear edge and
a longitudinal axis,
wherein the rear edge of the base plate includes a perpendicular section arranged perpendicular to the longitudinal axis, and
at least one plate-shaped fin with:
a first longitudinal section arranged at the upper surface of the base plate,
a second longitudinal section which extends beyond the rear edge and has a lower edge which is not connected to the base plate, characterized in that:
the first longitudinal section includes a rear part arranged rearwards of the perpendicular section and the base plate includes a first stiffening section arranged rearwards of the perpendicular section and forming a transition to the rear part.

The base plate is arranged in a base plate plane, which means it is an essentially flat, planar part. However, the base plate may include a slight curvature, in particular corresponding to a curvature of the outer surface of the wind turbine rotor blade. For example, the lower surface configured for being mounted to the outer surface of the wind turbine rotor blade may be slightly curved to match a convex shape of the outer surface of a wind turbine rotor blade. The base plate may have an essentially constant thickness, but may also include some thickness variation such as a tapering or a rounded shape at the front and rear edges.

The longitudinal axis of the base plate extends from the front edge to the rear edge and defines a forward/rearward direction of the base plate. When mounted to a rotor blade, the front edge will be placed in front of the rear edge, seen in the direction of airflow. In particular, the longitudinal axis may connect a midpoint of the front edge with a midpoint of the rear edge. The longitudinal axis may form an axis of symmetry of the base plate and/or of the entire vortex generator. When the vortex generator is mounted to a wind turbine rotor blade, the longitudinal axis may correspond to a flow direction of the air passing by the vortex generator. However, in some configurations or in some applications, the vortex generator may also be mounted on the wind turbine rotor blade surface such that the longitudinal axis forms an angle with reference to the direction of flow.

The lower surface of the base plate is configured for being mounted to an outer surface of the wind turbine rotor blade. For example, the lower surface may be provided with a double-sided adhesive tape. The lower surface may also include a circumferential sealing means and/or a recess for receiving a liquid adhesive or an adhesive tape. The lower surface may also have a surface structure prepared for optimal bonding via an adhesive, such as a roughened, cleaned or activated surface.

The vortex generator further includes at least one plate-shaped fin which extends from the base plate in a generally upward direction. The at least one plate-shaped fin is arranged at the base plate at an angle with reference to the direction of airflow when the vortex generator is mounted to an outer surface of a wind turbine rotor blade, so that the air passing by the at least one fin will form a vortex. The general shape of the fin resembles a plate which may be planar or may include a slight curvature. A lower end of the at least one plate-shaped fin generally follows the base plate plane. The at least one fin may have an essentially triangular shape with a straight rear edge arranged essentially perpendicular to the outer surface of the wind turbine rotor blade, and an upper/front edge forming a straight line. However, the upper/front edge as well as the rear edge of the at least one plate-shaped fin may have different shapes, including curved sections, and the at least one plate-shaped fin may be essentially rectangular or arc-shaped, for example.

No matter what the exact shape of the fin is, it has a first longitudinal section arranged at the upper surface of the base plate. This first longitudinal section forms a forward section of the fin, seen with reference to the forward/rearward direction of the base plate. The first longitudinal section has a lower end that may be connected along its entire length to the upper surface of the base plate. Herein, "connected" not only refers to a connection made between two separate elements, but also to a transition between both elements, in particular when these are formed in one piece.

A second longitudinal section of the at least one plate-shaped fin extends beyond the rear edge and has a lower edge which is not connected to the base plate. The second longitudinal section, with reference to the forward/rearward direction of the base plate, is arranged rearwards of the first longitudinal section. The first and second longitudinal sections may meet at an imaginary line which is arranged perpendicular to the upper surface of the base plate.

The rear edge of the base plate includes a perpendicular section arranged perpendicular to the longitudinal axis. This perpendicular section defines a reference point for describing the shape of the base plate. Those parts of the base plate arranged forward of the perpendicular section, seen in the direction of the longitudinal axis, may be considered a main part of the base plate.

The rear edge of the base plate differs from a straight line extending across the entire width of the base plate at least by the first stiffening section. This first stiffening section is arranged rearwards of the perpendicular section and forms a transition to a rear part of the first longitudinal section of the at least one plate-shaped fin. The first stiffening section may be considered a rear extension of the main part of the base plate. In other words, the base plate includes at least the main part and the first stiffening section meeting one another at an imaginary line which is perpendicular to the longitudinal axis and which is placed at the longitudinal position of the perpendicular section. In general, the perpendicular section and the longitudinal axis will include a common point, and the perpendicular section will be arranged at a rearmost point of the base plate except for the first stiffening section (and except for any further stiffening sections, see below). However, it is also conceivable that the base plate includes one or more additional extensions arranged rearwards of the perpendicular section and different from the first stiffening section (and different from any further stiffening sections).

Vortex generators with a fin extending beyond a rear edge of a base plate, such as those known from US 2019/0285046 and EP 3 690 230 B1, have the advantage that fins of a certain size required to obtain the desired aerodynamic effect, can be mounted to the outer surface of the wind turbine rotor blade with a relatively short base plate. This makes it easy to obtain a good bond between the base plate and the outer surface of the wind turbine rotor blade even when the outer surface has a curvature different from the base plate's mounting surface. Although the known vortex generators are relatively compact, robust devices, the inventor realized that in operation, aerodynamic loads in combination with environmental influences such as rain, sand/dirt, ultraviolet light, or colliding objects from time to time may damage the fins. In the worst case, the fin or a substantial part thereof may break off, so that the vortex generator can no longer fulfil its task. For restoring the full aerodynamic performance of the wind turbine rotor blade, it may become necessary to replace the vortex generator.

The inventor also realized that in some cases, the vortex generators may become damaged during transportation or service of the wind turbine rotor blades, for example by a rope moved along the wind turbine rotor blade's surface.

The disclosure provides the vortex generators with greater stability. They can withstand the mentioned adverse conditions for a much longer time, in most cases over the entire service life of the wind turbine rotor blade. As compared to a conventional vortex generator with a base plate having a straight rear edge, the at least one plate-shaped fin is supported and stabilized in a rear section via the first stiffening section. At the same time, the specific arrangement of the first stiffening section does not impair the aerodynamic performance of the vortex generator. Another advantage is that the simple and relatively short shape of the base plate is maintained, so that the vortex generators can be mounted to the surface of the wind turbine rotor blade easily and reliably.

In an aspect, the first stiffening section has a length measured in the direction of the longitudinal axis and a width measured in a direction perpendicular to the longitudinal axis, wherein the length is in a range of 20% to 100% of the width. This length-to-width ratio was found to provide efficient support while having only minimal influence on the aerodynamic performance.

In an aspect, the perpendicular section is a straight line being as long as or longer than the length of the first stiffening section. The perpendicular section may be symmetrical with reference to the longitudinal axis. In any event, the base plate will have a straight section at its rear end which can help mounting the vortex generator to the surface of the wind turbine rotor blade.

In an aspect, the perpendicular section is a point on a curved line describing the rear edge of the base plate. The curved line may extend over the entire width of the rear edge of the base plate, or only over a section thereof. For example, the curved line may be elliptical or arc-shaped. The perpendicular section in this aspect corresponds to a point on a tangent line perpendicular to the longitudinal axis and lying in the base plate plane.

In an aspect, the front edge is a straight line arranged perpendicular to the longitudinal axis. In general, the front edge of the base plate may also include a curvature or one or more sections arranged at an angle to the longitudinal axis. A straight front edge is particularly simple and may facilitate mounting of the vortex generator in a desired position on a surface of the wind turbine blade.

In an aspect, the first stiffening section has a triangular shape with a straight edge leading from the perpendicular section to a rear end of the rear part. The straight edge may be arranged in the base plate plane This is a simple yet efficient shape of the first stiffening section.

In an aspect, the first stiffening section has a concavely curved edge leading from the perpendicular section to a rear end of the rear part. The concavely curved edge may be arranged in the base plate plane. Providing the first stiffening section with a concavely curved edge leads to efficient stabilization while less material is required than with a triangular shape.

In an aspect, the concavely curved edge has a radius of curvature and the at least one fin has a maximum height, wherein the radius of curvature is in a range of 50% to 100% of the maximum height. Selecting a radius of curvature in this range leads to a good compromise between additional stability and material usage.

In an aspect, the first stiffening section has a thickness which is less than or the same as a thickness of an adjacent section of the base plate. This helps minimizing the aerodynamic influence of the first stiffening section, because the same is arranged entirely behind the main part of the base plate.

In an aspect, the vortex generator has exactly one fin, wherein the first stiffening section is arranged on a first side of the fin. The fin may be arranged along the longitudinal axis of the base plate.

In an aspect, the base plate includes a second stiffening section arranged on a second side of the fin opposite the first side. The base plate in this aspect may have a main part with two symmetrical halves arranged on both sides of the fin.

The second stiffening section may be arranged symmetrically to the first stiffening section. As a result, the fin is supported by one stiffening section on each side.

In an aspect, the vortex generator has exactly two fins arranged symmetrically with reference to the longitudinal axis, each fin having an inner side facing towards the longitudinal axis, wherein the first stiffening section is arranged at the inner side of a first fin, wherein the base plate includes a second stiffening section arranged at the inner side of the second fin. The first and second stiffening sections may be arranged symmetrically with reference to the longitudinal axis. The front edge may connect these two fins at a forwardmost point. Both fins are sufficiently supported by one of the stiffening sections.

In an aspect, the vortex generator has more than two fins and the base plate has a strip-shape supplemented by the first stiffening section and a plurality of further stiffening sections. The plurality of further stiffening sections may include further first stiffening sections, so that each fin has a stiffening section arranged at a first side. In addition or in the alternative, the plurality of further stiffening sections may include a number of second stiffening sections arranged on another side of a respective fin, so that one or more of the plurality of fins may be supported by two stiffening sections each.

In an aspect, the base plate has a trapezoidal, rectangular, hexagonal or circular shape supplemented by the first stiffening section and/or by the second stiffening section. The specific base plate-shapes mentioned may help arranging the vortex generator at a desired angle with reference to a direction of airflow, and may also help to find an easy way for mounting the base plate to the surface of the wind turbine rotor blade.

In an aspect, the vortex generator is produced in one piece using an injection molding process or the vortex generator is produced from one piece of sheet metal. Injection molding is a well-known process for manufacturing vortex generators from a plastics material, in particular in large numbers and at low costs. Blanking and bending of sheet metal is an alternative wherein the simple shape of the vortex generator leads to a simple shape of the sheet material to be blanked. After blanking, the fin may be bent with reference to the base plate. This is easily possible in particular for a symmetrical vortex generator including two fins.

The above stated object can also be solved by a wind turbine rotor blade having an outer surface and at least one vortex generator according to the disclosure mounted to the outer surface of the wind turbine rotor blade.

BRIEF DESCRIPTION OF DRAWINGS

The invention will now be described with reference to the drawings wherein:

FIG. 4 shows a second embodiment of a vortex generator in a perspective view;

FIG. 5 shows the vortex generator of FIG. 4 in a side view;

FIG. 6 shows the vortex generator of FIG. 4 in a top view;

DETAILED DESCRIPTION

Figures 1, 2, 3:
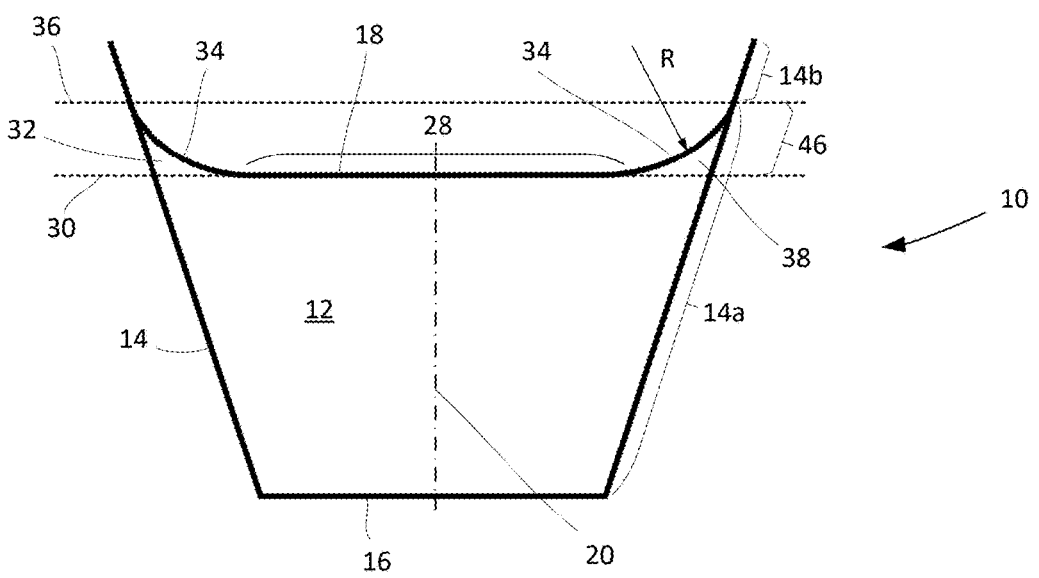
FIG. 1 shows a first embodiment of a vortex generator in a perspective view.
FIG. 2 shows a side view of the vortex generator of FIG. 1.
FIG. 3 shows a top view of the vortex generator of FIG. 1.

The vortex generator 10 of FIG. 1 includes a base plate 12 having an upper surface facing the viewer and a lower surface facing away from the viewer. The lower surface is configured for being mounted to an outer surface of a wind turbine rotor blade. The base plate 12 has a front edge 16 which is formed as a straight line, and a rear edge 18. A longitudinal axis 20 of the base plate 12 forms an axis of symmetry of the vortex generator 10 and extends from a midpoint of the front edge 16 to a midpoint of the rear edge 18.

The vortex generator 10 further includes two plate-shaped fins 14 arranged essentially perpendicular to the base plate plane. Each fin 14 has a triangular shape. The fins 14 are arranged at the upper surface of the base plate 12, and a lower end of each of the fins 14 transitions along an essentially straight line 22 into a side edge of the base plate 12.

The fins 14 each have a first longitudinal section 14a and a second longitudinal section 14b. The first longitudinal section 14a is separated from the second longitudinal section 14b by an imaginary line 24 extending upwards from the lower end of the fin 14, in a direction essentially perpendicular to the upper surface of the base plate 12. The second longitudinal section 14b extends beyond the rear edge 18 of the base plate 12 and has a lower edge 26 which is not connected to the base plate 12. This lower edge 26 as well as the second longitudinal section 14b end at the imaginary line 24.

FIG. 2 shows a side view of the vortex generator 10 of FIG. 1 in which one can appreciate the triangular shape of the fin 14 having a maximum height 48. The position of the base plate 12 behind the fin 14 facing the viewer is indicated by a dashed line corresponding to the upper surface of the base plate 12. The front edge 16 of the base plate is positioned at the front end of the fin 14. The imaginary line 24 between the first longitudinal section 14a and the second longitudinal section 14b of the fin 14 is also shown.

One can see a slight curvature of the lower end of the first longitudinal section 14a which corresponds to the lower surface of the base plate 12, and a slight curvature of the dashed line representing the upper surface of the base plate 12.

The shape of the base plate 12 can best be seen in FIG. 3 showing the base plate 12 in a top view. The rear edge 18 of the base plate 12 includes a perpendicular section 28 which is arranged perpendicular to the longitudinal axis 20. The position of this perpendicular section 28 along the longitudinal axis 20 determines the position of an imaginary line 30 which is also arranged perpendicularly to the longitudinal axis 20. The base plate 12 includes a first stiffening section 32 arranged rearwards of the perpendicular section 28 (and rearwards of the imaginary line 30). This first stiffening section 32 forms a transition to a rear part 46 of the first longitudinal section 14a of the fin 14. This rear part 46 of the first longitudinal section 14a is arranged rearwards of the perpendicular section 28 (and rearwards of the imaginary line 30) as well.

The first stiffening section 32 has a concavely curved edge 34 leading from the perpendicular section 28 to a rear end of the rear part 46. The concavely curved edge 34 has a radius of curvature R. The position of the rear end of the rear part 46 of the fin 14 is indicated by an imaginary line 36.

The base plate 12 further includes a second stiffening section 38 which is arranged symmetrically to the first stiffening section 32 with reference to the longitudinal axis 20.

The second embodiment shown in FIGS. 4 to 6 has a shape very similar to the first embodiment of FIGS. 1 to 3, and the same reference numerals are shown in the drawings. The fins 14 are identical. The only difference between the first and second embodiment is that the first stiffening section 32 and the second stiffening section 38 have a different shape. Both are triangular and have, instead of the concavely curved edge 34 shown in the first embodiment, a straight edge 40 leading from the perpendicular section 28 to the rear end of the rear part 46 of the fin 14.

FIG. 6 also shows the dimensions of the first and second stiffening sections 32, 38. Both have a length 42 measured in the direction of the longitudinal axis 20 and a width 44 measured in a direction perpendicular to the longitudinal axis. In the embodiment shown in FIGS. 4 to 6, the length is approximately 40% of the width 44.

Figure 7:
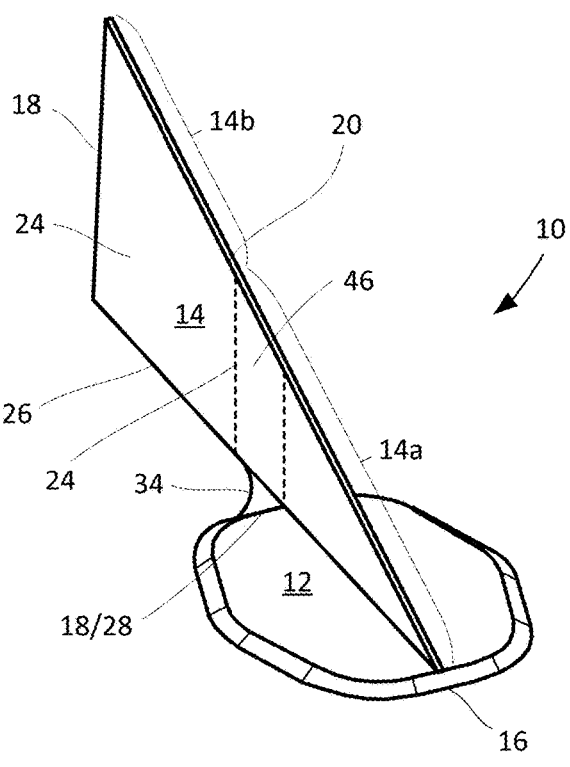
FIG. 7 shows a third embodiment of a vortex generator in a perspective view.
Figure 8:
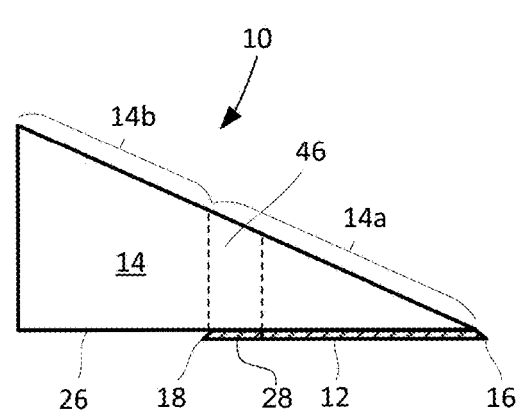
FIG. 8 shows the vortex generator of FIG. 7 in a side view.
Figure 9:
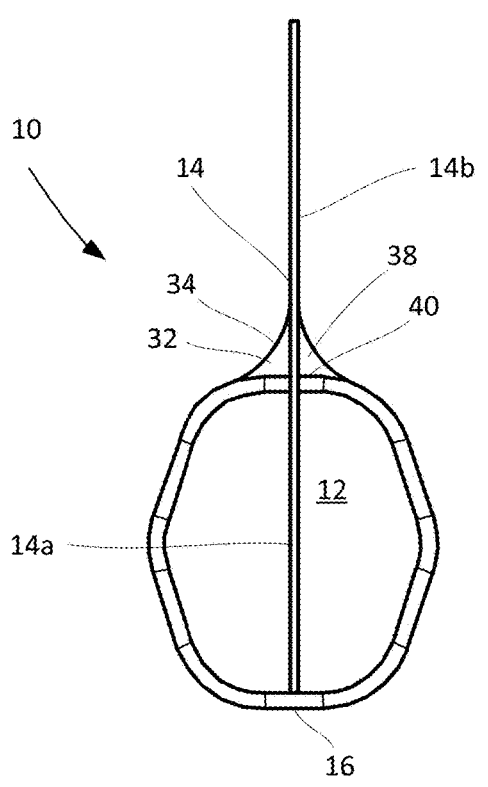
FIG. 9 shows the vortex generator of FIG. 7 in a top view.

The embodiment of FIGS. 7 to 9 shows another vortex generator 10 having a single fin 14 only. The base plate 12 has a hexagonal shape. The plate-shaped fin 14 is aligned with the longitudinal axis (not shown) of the base plate 12, and an imaginary line 24 divides the fin 14 into a first longitudinal section 14a and a second longitudinal section 14b which extends beyond the rear edge 18 of the base plate 12. The rear edge 18 has a perpendicular section 28 and a concavely curved edge 34 leading from this perpendicular section 28 towards a rear end of the rear part 46 of the first longitudinal section 14a of the fin 14. The second stiffening section 38, which is arranged symmetrically with reference to the first stiffening section 32 on the other side of the fin 14, can best be seen in FIG. 9. As shown in the section view of FIG. 8, the perpendicular section 28, which incorporates the first and second stiffening sections 32 and 38, has a thickness equivalent to that of the plate 12.

It is understood that the foregoing description is that of the preferred embodiments of the invention and that various changes and modifications may be made thereto without departing from the spirit and scope of the invention as defined in the appended claims.

LIST OF REFERENCE NUMERALS

10 vortex generator
12 base plate
14 fin
14a first longitudinal section
14b second longitudinal section
16 front edge
18 rear edge
20 longitudinal axis
22 straight line
24 imaginary line
26 lower edge
28 perpendicular section
30 imaginary line
32 first stiffening section
34 concavely curved edge
36 imaginary line
38 second stiffening section
40 straight edge
42 length
44 width

46 rear part
48 maximum height
R radius of curvature

The invention claimed is:

1. A vortex generator for a wind turbine rotor blade, the vortex generator comprising:
   a base plate arranged in a base plate plane and having a lower surface configured for being mounted to an outer surface of the wind turbine rotor blade, an upper surface opposite the lower surface, a front edge, and a rear edge;
   said base plate defining a longitudinal axis;
   said rear edge of the base plate including a perpendicular section arranged perpendicular to the longitudinal axis;
   at least one plate-shaped fin having a first longitudinal section arranged at said upper surface of the base plate and a second longitudinal section extending beyond said rear edge and having a lower edge which is not connected to said base plate;
   said first longitudinal section including a rear part arranged rearwards of said perpendicular section; and,
   said base plate including a first stiffening section arranged rearwards of said perpendicular section and forming a transition to said rear part.

2. The vortex generator of claim 1, wherein said first stiffening section has a length measured in a direction of said longitudinal axis and a width measured in a direction perpendicular to said longitudinal axis; and, said length is in a range of 20% to 100% of said width.

3. The vortex generator of claim 1, wherein said first stiffening section has a length measured in a direction of said longitudinal axis; and, said perpendicular section is a straight line as long as or longer than said length of said first stiffening section.

4. The vortex generator of claim 1, wherein said perpendicular section is a point on a curved line describing said rear edge of said base plate.

5. The vortex generator of claim 1, wherein said front edge is a straight line arranged perpendicular to said longitudinal axis.

6. The vortex generator of claim 1, wherein said first stiffening section has a triangular shape with a straight edge leading from the perpendicular section to a rear end of the rear part.

7. The vortex generator of claim 1, wherein said first stiffening section has a concavely curved edge leading from said perpendicular section to a rear end of said rear part.

8. The vortex generator of claim 1, wherein said first stiffening section has a thickness which is equivalent to a thickness of an adjacent section of said base plate.

9. The vortex generator of claim 1, wherein the vortex generator has exactly one plate-shaped fin; and, said first stiffening section is arranged on a first side of said plate-shaped fin.

10. The vortex generator of claim 9, wherein said base plate includes a second stiffening section arranged on a second side of said plate-shaped fin opposite said first side.

11. The vortex generator of claim 10, wherein said base plate has a trapezoidal, rectangular, hexagonal or circular shape supplemented by at least one of said first stiffening section and said second stiffening section.

12. The vortex generator of claim 1, wherein the vortex generator has exactly two plate-shaped fins including a first plate-shaped fin and a second plate-shaped fin arranged symmetrically with reference to said longitudinal axis; each of said two plate-shaped fins has an inner side facing towards said longitudinal axis; said first stiffening section is arranged at said inner side of said first plate-shaped fin; and, said base plate includes a second stiffening section arranged at the inner side of said second plate-shaped fin.

13. The vortex generator of claim 1, wherein the vortex generator is produced in one piece using an injection molding process or wherein the vortex generator is produced from one piece of sheet metal.

14. A vortex generator for a wind turbine rotor blade, the vortex generator comprising:

a base plate arranged in a base plate plane and having a lower surface configured for being mounted to an outer surface of the wind turbine rotor blade, an upper surface opposite the lower surface, a front edge, and a rear edge;

said base plate defining a longitudinal axis;

said rear edge of the base plate including a perpendicular section arranged perpendicular to the longitudinal axis;

at least one plate-shaped fin having a first longitudinal section arranged at said upper surface of the base plate and a second longitudinal section extending beyond said rear edge and having a lower edge which is not connected to said base plate;

said first longitudinal section including a rear part arranged rearwards of said perpendicular section;

said base plate including a first stiffening section arranged rearwards of said perpendicular section and forming a transition to said rear part;

said first stiffening section having a concavely curved edge leading from said perpendicular section to a rear end of said rear part;

said concavely curved edge having a radius of curvature and said at least one plate-shaped fin has a maximum height; and, said radius of curvature being in a range of 30% to 100% of said maximum height.

15. A wind turbine rotor blade comprising:

a wind turbine rotor blade body having a rotor blade outer surface;

at least one vortex generator including a base plate arranged in a base plate plane;

said base plate having a lower surface configured for being mounted to an outer surface of the wind turbine rotor blade, an upper surface opposite the lower surface, a front edge, and a rear edge;

said base plate defining a longitudinal axis;

said rear edge of the base plate including a perpendicular section arranged perpendicular to the longitudinal axis;

said at least one vortex generator further including at least one plate-shaped fin having a first longitudinal section arranged at said upper surface of the base plate and a second longitudinal section extending beyond said rear edge and having a lower edge which is not connected to said base plate;

said first longitudinal section including a rear part arranged rearwards of said perpendicular section;

said base plate including a first stiffening section arranged rearwards of said perpendicular section and forming a transition to said rear part; and, said at least one vortex generator being mounted on said rotor blade outer surface.

* * * * *